Sept. 22, 1959
R. TRUBERT
2,904,914
LANTERN-SLIDE CARRIERS
Filed March 19, 1957
3 Sheets-Sheet 2
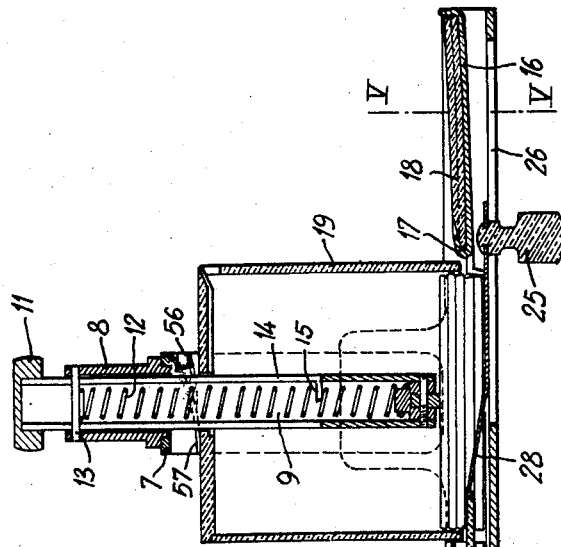
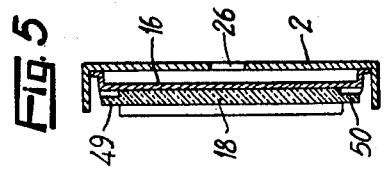
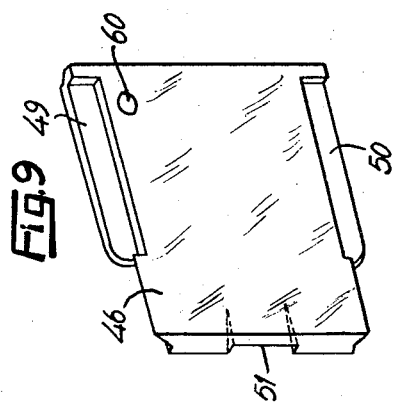
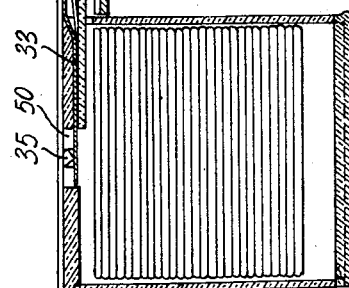
INVENTOR
RENÉ TRUBERT
By Linton and Linton
ATTORNEYS

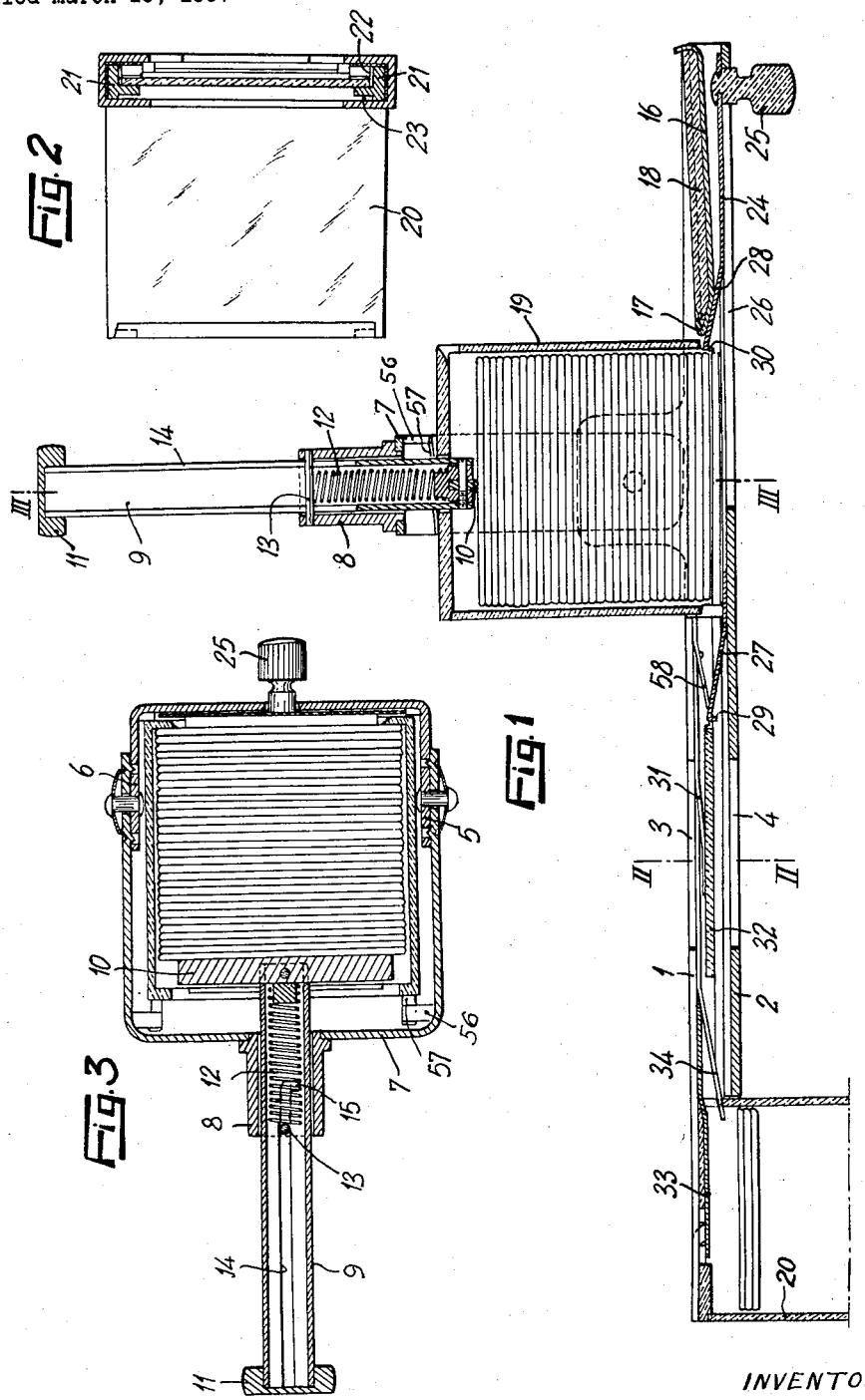

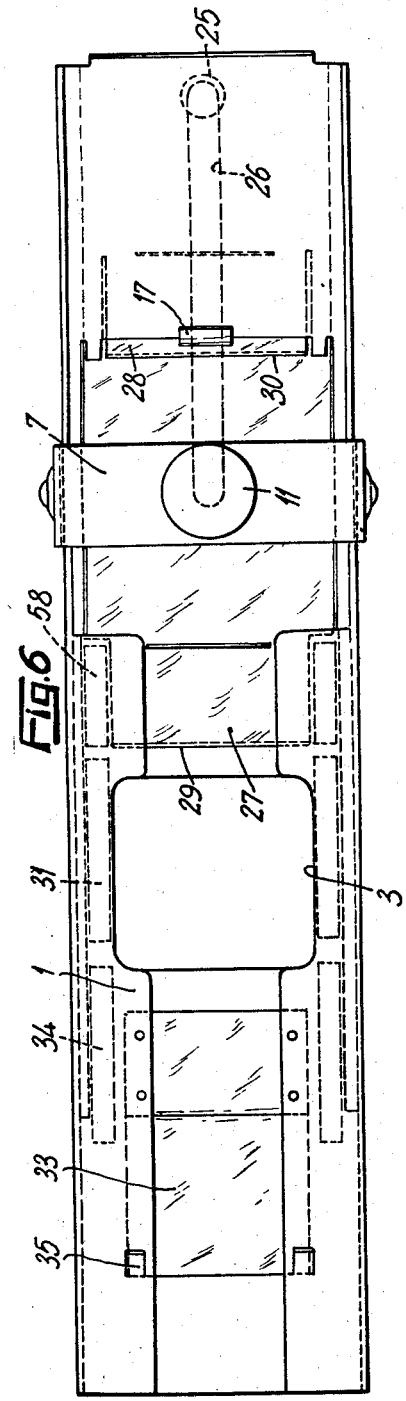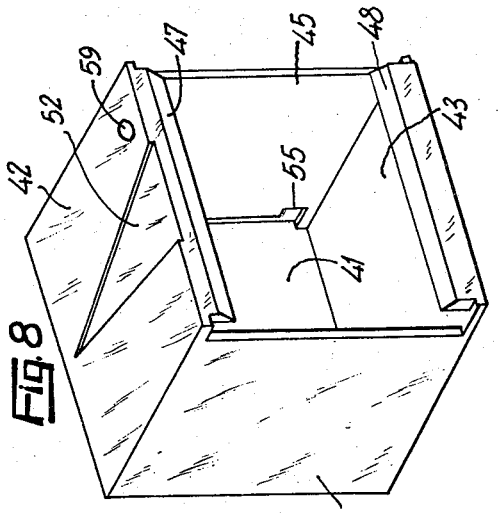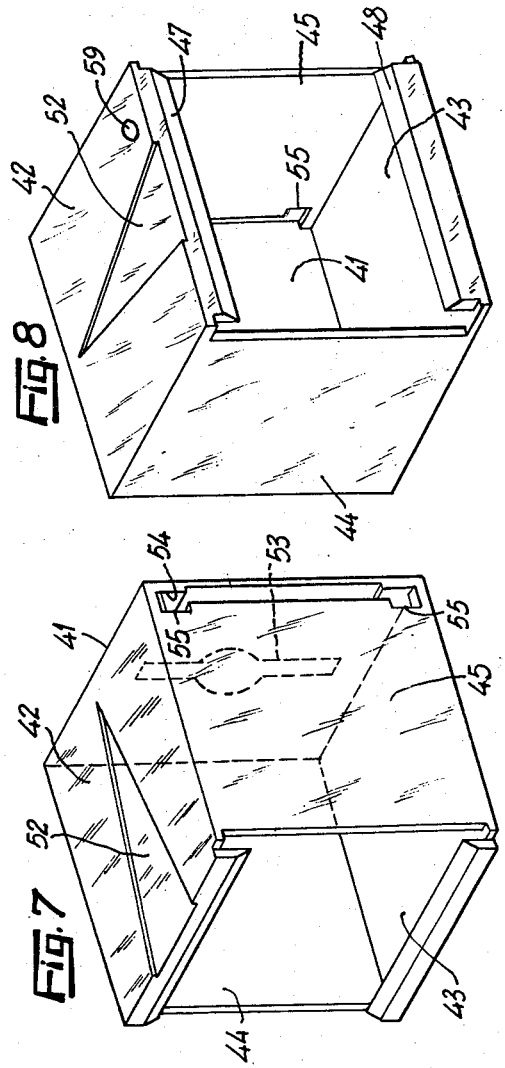

United States Patent Office 2,904,914
Patented Sept. 22, 1959

2,904,914

LANTERN-SLIDE CARRIERS

René Trubert, Viroflay, France

Application March 19, 1957, Serial No. 647,118

Claims priority, application France March 28, 1956

4 Claims. (Cl. 40—78)

This invention relates to projectors and more particularly to projection lanterns, and its essential object is to provide an improved lantern-slide carrier for apparatus of this general character, whereby classifying boxes may be used and the slides to be projected may be transferred from one classifying box constituting the feed box through the projection lantern to another classifying box constituting the receiving box, without handling the slides or altering the order in which they are classified in the boxes. Thus, the same views may be projected in the same way and in the same order without extracting them from the receiving box, so that the latter may constitute the feed box at each subsequent projection.

It is another object of this invention to provide interchangeable, identical classifying boxes of very simple design and construction, which are on the other hand very cheap to manufacture and permit the preserving of a relatively large number of properly classified views in a low-cost equipment whereby they can be projected immediately without any handling whatsoever.

This invention is applicable more particularly to the projection of lantern slides in cardboard or glass mountings of the 2" x 2" size, such as 24 mm. x 36 mm. views, colored or not.

The lantern-slide carrier according to this invention is adapted to be associated with interchangeable classifying boxes of the aforesaid character, which have on the one hand a vertical section corresponding to the size of the slide mountings and a depth (measured in a direction at right angles to the planes of the slides) of variable dimension, if desired. The lantern-slide carrier proper consists of a frame structure forming a slide channel adapted to be inserted across the projector in the transverse aperture provided for this purpose and to receive on one side (for instance on the right-hand side) the feed box containing the slides to be projected and on the other side the receiving box for the projected slides, a sliding driver plate being adapted to be reciprocated in the aforesaid channel for transferring on the one hand the slide to be projected from the feed box to the projection gate, and on the other hand the projected slide from the projection gate to the receiving box.

To facilitate the description, the terms "width," "height" and "depth" will be used hereafter to designate the three dimensions of the classifying boxes (these boxes having the form of a rectangular parallelepiped); these three terms correspond to the position of these boxes when they are mounted on the carrier frame for projecting slides on to a vertical screen, under these conditions, the width is the horizontal dimension of the plane of the slide, the height is the vertical dimension thereof, and the depth is the dimension measured in a direction at right angles to the plane of the slides when these are stacked in a vertical position in the boxes. When 5 cm. x 5 cm. or 2" x 2" slides are used, the width and height of the boxes will be approximately equal, whereas the depth may vary as a function of the maximum number of slides to be kept in each box.

As will be explained presently, it is also possible to use boxes having different depths with the same carrier.

One of the two walls of the box which are parallel to the slide planes is rigid with the box and will be termed hereafter "vertical bottom" and the movable or detachable opposite wall will be termed "cover." The essential feature of the invention is that the slides are extracted from the feed box through the vertical aperture resulting from the removal of the cover, these slides being introduced into the receiving box (which, as already stated, is the same as the feed box) through a vertical side aperture or slot adjacent to the bottom wall so that the order in which the slides are stored in the receiving box will be the same as in the feed box.

In their operative positions on the slide carrier mounted across a projector having a substantially horizontal optical axis as required for projecting views on to a vertical screen, the feed box and the receiving box extend in the same direction, the feed box aperture registering with one end of the slide carrier channel while the bottom of the receiving box is fastened to the other end of the slide carrier channel. According to a preferred arrangement the slide carrier extends with its greater dimension disposed horizontally through the projector gate and the feed box is positioned on the right-hand side and on the front or screen side relative to the slide-carrier channel, so as to free the right-hand portion of the projector on the operator's side.

In this arrangement, the lateral aperture or slit for introducing the slides into the box will therefore be formed in the right-hand side wall and this slit will also be utilized for fastening the receiving box on the carrier frame.

The vertical bottom wall of each box comprises at least one hole for permitting the passage of a spring-urged push member acting on the frames or mountings of the views contained in the feed box so as to push them towards the outlet of this box which registers with the feed channel. This bottom hole may be utilized to constitute one component element of a snap-bolt device for quickly attaching the receiving box on the carrier frame.

As the views or lantern-slides enter the receiving box in succession along the bottom wall thereof so as to be subsequently pushed forwards by the following slides, it will be readily understood that finally the first slide will be positioned on the cover side and the last slide will lie near the bottom wall. When the slides are inserted manually in the box, it is possible to introduce them either in the normal order (that is, 1st, 2nd, 3rd, 4th . . . n) through the bottom slit, or in the reverse order (that is, n . . . 4th, 3rd, 2nd and 1st) through the aperture left upon removal of the cover. Of course, care should be taken to properly position the slides, that is, upside down, in view of forming the real inverted image of the slide on to the screen. Considering the box as being positioned as set forth hereinabove and if it is desired to introduce therein a lantern-slide disposed as required for correctly projecting the view thereof on to the screen, it is evident that before introducing this slide the latter must be rotated through a half-turn in its plane since the projected image is a magnification of the projected view, the latter being inverted or rotated through 180° about the optical axis or about its axis of symmetry (which is the same). Now, as a rule, the slides carry a mark adjacent to one corner on one face to facilitate the proper positioning thereof.

The feed box may be held in position through a frame-like member extending at right angles to the carrier frame on the screen side, this member being preferably hinged on the carrier frame so that it may be folded thereon when inoperative, the carrier frame being provided with the aforesaid push member, as will be made clear presently.

In order to afford a better understanding of the present invention and of the manner in which the same may be carried out in the practice, reference will now be made to the attached drawings forming part of this specification and illustrating diagrammatically by way of example a typical embodiment of the invention. In the drawings:

Figure 1 is a longitudinal horizontal section illustrating the arrangement of the slide carrier in its operative condition;

Figure 2 is a vertical section taken upon the line II—II of Figure 1;

Figure 3 is a vertical section taken upon the line III—III of Figure 1;

Figure 4 is a view similar to Figure 1 but showing the movable driver plate in an intermediate position during the transfer of the projected slide and of the next slide to be projected;

Figure 5 is a vertical section taken upon the line V—V of Figure 4;

Figure 6 is a front view of the slide carrier as seen from the feed-box side;

Figures 7 and 8 are perspective views showing a classifying box as seen from the right-hand side and left-hand side, respectively; and Figure 9 is a perspective view of the cover.

In the example illustrated it is assumed that the slide carrier is adapted to extend horizontally across the projector, the optical axis of this projector being coincident with the section line II—II of Figure 1.

The slide carrier frame has the general form of a rectilinear elongated channel of substantially rectangular cross-section; its front face (i.e. on the screen side) comprises a wall 1 only on the left-hand side, and the rear wall 2 extends from the left-hand end just to the distance required for permitting the mounting of the receiving box. Each wall 1, 2 has formed therein an aperture 3, 4 of which the size corresponds to the view to be projected, the axis of this aperture being coincident with the line II—II of Figure 1, so that this axis will be merged in the optical axis in the projection conditions. At the line III—III of Figure 1 the upper and lower flanges of the frame are formed with front lobes 5, 6 on which are pivotally mounted the arms of a strap 7 adapted to receive therebetween the feed box 19. Said feed box is inserted in the leftward direction when the strap is positioned at right angles to the frame 1, 2. The bottom of this strap 7 carries on the front side a guide cylinder 8 in which a hollow tubular rod 9 of a push member 10 is slidably fitted. This push member 10 proper is preferably in the form of a thin transverse bar and the outer end of the rod 9 carries an operating knob 11. The push member 10 is constantly urged towards the channel of the slide carrier by a coil spring 12 fitted within the rod 9 and bearing against a diametral pin 13 rigid with the cylinder 8 and extending through longitudinal slots 14 formed along the hollow rod 9. These slots may comprise at their inner ends bent extensions 15 adapted to retain the pin 13 when the rod 9 is rotated through a certain angle in its outer position so as to lock the push member in this position and prevent it from being moved by the spring in the axial direction.

The bottom of the strap 7 on its right-hand side is provided with lugs 56 carrying spring blades 57 adapted to engage the feed box inserted in the strap. These blades prevent the box from moving away from the slide carrier when it is slid thereagainst to the right and holds it in a waiting position on its cover.

On the right-hand side of the strap 7 the front face of the slide carrier is formed with a wall 16 having a hook 17 formed centrally of its left-hand edge. This hook 17 extends outwards and to the right, as shown in Figure 1. The wall 16 is adapted to receive the cover 18 of the feed box 19 so that the cover 18 is retained automatically by the hook 17 so as to free the rear aperture of the box when the latter is fitted in the strap aperture.

Inside the two smaller sides of the channel and between the feed box 19 and the receiving box 20 two symmetrical rails 21 are formed or secured which constitute on the front side guide grooves 22 for the slide mounting and on the rear side guide grooves 23 for the movable driver plate 24 which is provided with a control knob 25 extending through a longitudinal slot 26 formed in the rear wall 2.

The movable driver plate 24 consists of a steel plate formed with a pair of pawl-forming elastic tongues 27, 28 bent slightly to the front and having a left-hand edge 29, 30 bent at right angles to the plane of the driver plate and adapted to engage a slide for driving same along the channel of the carrier. The guide grooves 22 are provided with leaf springs 31 adapted to maintain the slides 32 vertically by urging same against the webs of the aforesaid rails in the projection position, other leaf springs 58 being provided in the channel to prevent the slide in the projection position from receding to the right when the driver plate is actuated in this direction.

At its left-hand end the front wall 1 carries a thin steel blade 33 having a left-hand portion somewhat spaced from the front wall 1 to permit the insertion of the bottom of the receiving box 20 between this wall 1 and the blade 33. Finally, leaf springs 34 are provided on the left-hand side of springs 31 and extend within the receiving box 20 in their operative positions. Moreover, the front wall 1 of the carrier is formed with punched portions or bosses 35 projecting inwards to engage the vertical aperture in the bottom wall of the receiving box fitted on the carrier, so as to lock this box in position.

The box construction will now be described without discriminating the feed box from the receiving box, since each box is adapted to constitute indifferently and alternately a feed box and a receiving box, all the boxes utilized with the device of this invention being of same type, although their depth may vary according to the number of slides to be inserted therein, as already stated.

In Figures 7 to 9 of the drawings the box illustrated comprises a bottom 41, an upper wall or top 42, a lower wall 43, a left-hand wall 44, a right-hand wall 45 and a detachable cover 46. The upper and lower edges of the aperture to be closed by the cover 46 is formed preferably with ribs 47, 48 constituting inner channels or grooves adapted to be slidably engaged by the upper and lower wings or flanges 49, 50 on the edges of the cover 46. The left-hand edge of the cover 46 has a notch 51 formed centrally of its inner face which notch 51 constitutes a kind of ramp adapted to be engaged by the aforesaid hook 17. Both or one of the flanges 49, 50 may be provided with a friction pad (not shown) to counteract any tendency of the cover to slide when it is in its closed position. The upper wall 42 of the box may be formed with a positioning mark 52, for example of triangular or arrow configuration, whereby the operator may easily and correctly position the boxes when erecting the apparatus. The bottom 41 has an aperture 53 permitting the passage of the push member and tubular rod 10, 9. Finally, the right-hand wall 45 is formed in a direction parallel to the bottom with an inlet slot 54 of which the edge on the bottom side may be of such configuration as to receive the resilient blade 33 for holding the box when the latter constitutes the receiving box, the other edge of this slot having formed at either ends a notch 55 for permitting the insertion of the slide-engaging leaf springs 34. Positioning marks 59, 60 may be provided in corresponding corners on the top wall 42 and on the outer face of the cover 18 to facilitate the correct insertion of the latter.

The operation of the slide carrier according to the invention will now be described. For transporting, shipping or packing the apparatus, the strap 7 is folded back against the front wall of the carrier by pivoting about the vertical pivot axis of the strap. When the carrier is to be used the strap 7 is pulled to a position at right angles to the main plane of the carrier and any locking or like means may be provided to prevent the strap from pivoting beyond, and to maintaining it in this position, for example as shown in Figure 3. The device is then inserted in the aforesaid position through the transverse aperture usually provided across the gate of the projector.

The feed box 19 is fitted in position by sliding it from the right to the left by engaging its bottom wall carrying the cover 18 against the wall 16, the box being properly positioned by observing the positioning mark 52 pointing in the direction of the screen, or through any other suitable means. As the box 19 is moved as indicated the hook 17 engages the notch 51 of cover 46 and the latter is thus automatically retained in the position shown in Figure 1, the box continuing its movement until it fits between the upper and lower walls of the slide carrier and inside the strap 7, the push-member thereof having been pulled to its recessed position as already explained. When this push member is released, by rotating the handle 11 in the proper direction, it is thus allowed to engage the aperture 53 and to exert a resilient pressure on the slides contained in the feed box 19.

The rear or receiving box 20 is fitted in its operative position on the carrier by placing it in the same position as the feed box 19, the bottom wall 41 of the receiving box 20 being pressed against the wall 1 of the carrier and moved from the left to the right so that the spring 33 engages the inlet slit 54. The leaf spring 33 acts as a clamp and maintains the box in position and when the box has attained its normal operative position the punched portions or bosses 35 engage the bottom notches 55 to prevent the box from receding. Under these conditions, the apparatus is ready for use.

Assuming that the slide carrier is in the condition illustrated in Figure 1 it will be seen that the left-hand edge or pawl 30 of tongue 28 is adjacent to the right-hand edge of the first slide in the feed box 19. The driver plate 24 is then actuated through its control knob 25 to the left and this slide will move to an intermediate position as shown at 61 in Figure 4, the end position being indicated at 32 in Figure 1. As the control knob 25 is moved back to its initial position the pawl-forming tongue 28 recedes past the next slides in the box 19 and resumes its initial position indicated in Figure 1, the first slide to be projected remaining at 32 and ready to be projected.

When the slide 32 has been projected, the driver plate is again reciprocated, the edge 30 engaging the next slide as the edge 29 of pawl 27 pushes the first slide 32 towards the box 20. The second view or slide will be positioned at 32, Figure 1, as already explained, while the first slide engages the inlet slit 54 and presses the leaf spring 34 against the bottom of box 20. When this slide has cleared the slit 54 completely it releases the spring 34 and the latter expands so as to push the slide inside the box 20 in the direction of its cover and to free the inlet slit 54 for the next slide. The inner faces of the side walls 44, 45 may be covered by sheets of yielding material or any other device adapted to prevent the slides from dropping on to the lower wall 43 of the box.

The above-described operation takes place each time the driver plate 24 is reciprocated, until all the slides in the feed box 19 are transferred to the receiving box 20 where they are exactly in the same order upon completion of the projection. As a result, the box 20 has received all the slides previously contained in the feed box 19.

Under these conditions, it is possible to project the slides contained in another box. To this end, the now filled receiving box 20 is firstly removed by moving it away from the wall 1 against the resistance of the resilient blade 33 to free the box from the punched portions 35 and subsequently pulling this box to the left. To remove the empty box 19, which is now to become the receiving box 20, this box is firstly moved to the right, thereby automatically fitting it on the cover 18 before removing the box from the carrier. This box, or another box, may now be fitted in lieu of the receiving box 20, and another filled box 19 may be substituted. Therefore, thus, another set of slides may be projected.

It is evident that when the slides are properly classified in the boxes it is no longer necessary to handle or classify them. They just pass from one box to another automatically when the device is actuated during the projection of one series of slides, the initial classification remaining unaltered.

However, when it is desired to either modify this classification or classify new slides, it is extremely easy to take the slides out from a box by removing the cover therefrom, and it is also easy to insert new slides into a box, for example by introducing them through the inlet slit 54 in the order in which it is desired to project them, or through the aperture of the cover, in the reverse order. Of course, care will be taken before introducing the slides that the usual positioning mark is on the cover side adjacent to the upper and right-hand corner. The similar marks 59, 60 in the corresponding corner of the cover and in the adjacent corner of the upper wall of the box will facilitate the proper setting of the slides to be introduced.

These boxes may advantageously be of plastic material, and their width may advantageously decrease slightly from the bottom to the cover.

From the foregoing it will be readily understood that the embodiment described hereinabove and illustrated in the attached drawings should not be construed as limiting the purpose of this invention, as many modifications may be brought thereto without departing from the spirit and scope of the invention as set forth in the appended claims.

On the other hand, the movement of the slides from the feed box to the receiving box, and therefore the driver plate movement, may also take place in the opposite direction, that is, from left to right, and even downwards or upwards. The vertical movement may be very convenient in the case of stereoscopic projection for realising views in three dimensions.

On the other hand, the boxes may be adapted to receive glass-mounted views instead of cardboard slides. In this case their inlet slit 54 and their outlet slit between the ribs 47, 48 and the wall 44 must have the proper width.

Each classifying box may comprise firstly a pilot-mounting wherein the view is replaced by tracing paper on which the user may inscribe any data or reference mark corresponding to the slides of a same box. The last mounting in the box may carry a special identifying mark.

What I claim is:

1. Interchangeable slide feed boxes for projection lanterns comprising boxes of substantially parallelepipedic shape, slidably detachable covers for each of said boxes, each box having a central opening formed in the bottom wall opposite to said cover, a lateral inlet slit adjacent and parallel to said bottom wall and an outlet slit parallel and opposite to said inlet slit, a slide carrier frame for being detachably supported across the projection lantern, said boxes being adapted to be used two by two as slide feed box and slide receiving box disposed with the same orientation and removably mounted on either side of said slide carrier, said slide feed box being held in position on said frame by a strap pivotally connected thereto and a spring-loaded push member on said feed box adapted to extend through said central opening for urging the slides within said feed box towards said frame after the aperture of said feed box is uncovered by said cover.

2. Interchangeable slide feed boxes for projection lanterns comprising boxes of substantially parallelepipedic shape, a slidably detachable cover for each of said boxes, each box having a central opening formed in the bottom wall opposite to said cover, a lateral inlet slit adjacent and parallel to said bottom wall and an outlet slit parallel and opposite to said inlet slit, a slide carrier frame for being detachably supported across the projection lantern, said boxes being adapted to be used two by two as slide feed box and slide receiving box disposed with the same orientation and removably mounted on either side of said slide carrier frame, said slide feed box being held in position on said frame by a strap pivotally connected thereto, a spring-loaded push member on said feed box adapted to extend through said central opening for urging the slides within said feed box towards said frame after the aperture of said feed box is uncovered by said cover and a resilient blade having one end fixed to said frame and the other end engaging the inner face of said receiving box through said inlet slit thereof for holding said slide receiving box on said frame.

3. A slide carrier for a projection lantern, comprising a pair of boxes each capable of retaining a plurality of slides, a channel-shaped frame adapted to extend across the projection lantern and having said boxes detachably connected to the end portions thereof for being positioned on opposite sides of the projector with said boxes providing a slide feed box and a slide receiving box, said boxes being disposed with the same orientation, said boxes each having an open end, a pair of covers each being detachably mounted on one of said boxes for closing its open end, said channel-shaped frame being provided with a recess for said feed box and a recess adapted to receive the cover of said feed box with said cover receiving recess being adjacent to said box-receiving recess, a driver plate slidably mounted in said channel and adapted to be reciprocated longitudinally of said channel, a plurality of pawls provided on said driver plate for successively feeding the slides from said feed box to the projection position and from said projection position to said receiving box in which they are stowed in the order in which they previously were in said feed box.

4. A slide carrier for a projection lantern, comprising a pair of boxes each capable of retaining a plurality of slides, a channel-shaped frame adapted to extend across the projection lantern and having said boxes detachably connected to the end portions thereof for being positioned on opposite sides of the projector with said boxes providing a slide feed box and a slide receiving box, said boxes being disposed with the same orientation, said boxes each having an open end, a pair of covers each being detachably mounted on one of said boxes for closing its open end, said channel-forming frame being provided with a recess for said feed box and a recess adapted to receive the cover of said feed box with said cover receiving recess being adjacent to said box-receiving recess, a hook being provided in said cover recess and adapted to automatically remove said cover from said feed box as the latter is being positioned on said carrier and automatically refill said cover on said box when said box is removed from said carrier, a driver plate slidably mounted in said channel and adapted to be reciprocated longitudinally of said channel, a plurality of pawls provided on said driver plate for successively feeding the slides from said feed box to the projection position and from said projection position to said receiving box in which they are stowed in the order in which they previously were in said feed box.

References Cited in the file of this patent
UNITED STATES PATENTS

| | | |
|---|---|---|
| 1,093,401 | Gottlieb | Apr. 14, 1914 |
| 1,893,668 | Diaz | Jan. 10, 1933 |
| 2,482,117 | Leas | Sept. 20, 1949 |
| 2,503,239 | Antos | Apr. 11, 1950 |
| 2,513,102 | Parlini et al. | June 27, 1950 |
| 2,533,441 | Estes | Dec. 12, 1950 |
| 2,705,437 | Lessman | Apr. 5, 1955 |